Patented July 3, 1934

1,965,286

UNITED STATES PATENT OFFICE 1,965,286

SIRUP

Charles William Haines, Masonville, N. J.

No Drawing. Application September 10, 1931,
Serial No. 562,205

2 Claims. (Cl. 99—11)

This invention relates to a new and novel sirup composition especially adapted for table use, though its use is not necessarily nor properly limited to such use, but which may be used in the same manner and for similar purposes as other sirup compositions of well known character may be used.

It is an object of this invention to provide a new and novel sirup composition of the type described from apple cider and other similar natural fruit products and ordinary sugar, preferably granulated sugar.

It is also an object of this invention to provide a sirup composition of the type described which is free of artificial preservatives and in which the sugar will not ferment or crystallize, but is permanently stable, whereby no deterioration takes place in the sirup composition while in storage over a long period of time.

It is also an object of this invention to provide a process or method of combining the apple cider or the like and the sugar, so as to produce a sirup composition as described herein.

These and other objects of the invention, its nature and its composition, combination and arrangement of parts and ingredients and the duration and sequence of steps and operations involved will be readily understood by anyone acquainted with the art to which this invention relates upon consulting the following description.

A rough but practical and serviceable formula constituting a preferred embodiment of the invention comprises the use of apple cider or other similar fruit juice products and granulated sugar such as is packed and dispensed for table use, though other forms of sugar can be successfully used.

Of course, the selection of cider and sugar is to be made with consideration of the taste and other qualities of the finished product. The proportions found to be effective and typically illustrative of the invention are: 100 pounds of cider and 100 pounds of sugar.

Under ordinary circumstances no other additive substances are required to complete the desirability of the final product. However it is to be understood that I desire to include in the concept disclosed herein such incidental improvements either in the formula, such as in the addition of flavoring or texture improving extract or materials and in the process described herein, which do not result in the production of an essentially different final product.

A successful process or method of making the final product of the invention consists in stirring or otherwise mixing together the one hundred pounds of cider and the one hundred pounds of type of sugar otherwise defined as sucrose. When the sucrose and cider are properly mixed, the mixture is heated to a temperature between two hundred and twelve degrees Fahrenheit and two hundred and twenty degrees Fahrenheit until a test shows a concentration of seventy two percent more or less of solids.

It has been discovered by experiment that a temperature of less than two hundred and twelve degrees Fahrenheit is not effective to bring about the inversion of the sugar to dextrose and levulose, that a temperature over two hundred and twenty degrees Fahrenheit will spoil the result of the product in the form of sirup, but a sufficient raising of the temperature above two hundred and twenty degrees Fahrenheit will result in burning and the formation of caramel.

Experiments have disclosed that if the solid concentration is less than sixty per cent, fermentation of the sugar will take place in storage, and that if the percentage of solid material in the product is over eighty per cent crystallization of the sucrose will take place. Therefore, it is inferred that the mixture of cider and sucrose must be heated between two hundred and twelve and two hundred and twenty degrees Fahrenheit for such a length of time as would sufficiently evaporate or distill or otherwise physically and chemically affect the mixture by means of heating, so that the mixture will test between sixty and eighty per cent solid content.

Experiments thus far have disclosed that approximately seventy two per cent of solid is a very practical and convenient test.

The final product appears to have all of the advantages of such sirup compositions as maple sirup and the like and in addition its viscosity will not materially vary under temperature changes, and the objectionable congealing exemplified during temperature changes in maple sirup and the like products is almost entirely absent in the product of the invention under similar conditions. The taste of the sirup of the invention is distinctly that of the apple, and as produced under the method disclosed herein there is a slight tart reaction, and is also aromatic.

It is believed that the above is sufficient description to enable anyone acquainted with the art to which this invention relates to understand, make and use the invention, and further description will not be given.

However it is to be definitely understood that I do not desire to limit the application of this invention to the particular modifications set out herein to illustrate the principles thereof and any change or changes may be made in materials and ingredients, and in the sequence and duration of steps and operations involved, within the spirit and scope of the invention.

Having thus described my invention, what I claim as new is:

1. Apple sirup comprising the reaction product of a mixture of apple cider and sucrose concentrated by heating so that it contains approximately 72 percent solid matter and has a major portion of its sugar content in the inverted sugar form, said product retaining substantially the flavor and aroma and the original acidity of the apple cider.

2. A process of making a non-fermentable, non-crystallizing apple sirup of the type described, said process comprising mixing together substantially equal quantities by weight of apple cider and sucrose, heating the resultant mixture at a temperature between 212° and 220° Fahrenheit to invert the sugar elements in the mixture, the heating being continued until the mixture tests approximately 72 percent total solid material.

CHARLES W. HAINES.